US012415621B2

(12) United States Patent
Muff et al.

(10) Patent No.: US 12,415,621 B2
(45) Date of Patent: Sep. 16, 2025

(54) SATELLITE WITH SPOT LIGHT MODE FOR EXTENDED DURATION TARGET IMAGING

(71) Applicant: ICEYE OY, Espoo (FI)

(72) Inventors: Darren Muff, Espoo (FI); Vladimir Ignatenko, Espoo (FI); Matthew Nottingham, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 18/576,155

(22) PCT Filed: Jul. 12, 2022

(86) PCT No.: PCT/EP2022/069402
§ 371 (c)(1),
(2) Date: Jan. 5, 2024

(87) PCT Pub. No.: WO2023/285432
PCT Pub. Date: Jan. 19, 2023

(65) Prior Publication Data
US 2024/0150040 A1    May 9, 2024

(30) Foreign Application Priority Data
Jul. 14, 2021   (GB) ...................................... 2110156

(51) Int. Cl.
B64G 1/10 (2006.01)
B64G 1/28 (2006.01)
G01S 13/90 (2006.01)

(52) U.S. Cl.
CPC ......... *B64G 1/1035* (2023.08); *B64G 1/1028* (2023.08); *B64G 1/283* (2013.01); *G01S 13/9029* (2013.01); *G01S 13/9052* (2019.05)

(58) Field of Classification Search
CPC .... B64G 1/1035; B64G 1/1028; B64G 1/283; B64G 1/244; B64G 3/00; B64G 1/66;
(Continued)

(56) References Cited

U.S. PATENT DOCUMENTS 4,602,257 A    7/1986 Grisham
5,959,566 A *  9/1999 Petty ................... G01S 13/9029
                                              342/160
(Continued)

FOREIGN PATENT DOCUMENTS

CN    110596704 A    12/2019
CN    111947646 A    11/2020
(Continued)

OTHER PUBLICATIONS

Australian Examination Report for related Australian Patent Application No. 2022311497 dated Jun. 4, 2024.
(Continued)

*Primary Examiner* — Valentina Xavier
(74) *Attorney, Agent, or Firm* — Cozen O'Connor

(57) ABSTRACT

A satellite (140) for operation in orbit around the earth comprises an ADCS (131, FIG. 1) configured for mechanically steering the satellite in the azimuth direction to prolong a dwell time (1105), during which a selected target is visible from the satellite, as the satellite orbits over the target. A processor at the ground station may be configured to process raw SAR data from any of the satellites described here. The raw SAR data may be processed in a number of ways to provide image information including but not limited to forming multilook images, compiling video sequences and colour coding images.

26 Claims, 15 Drawing Sheets

(58) Field of Classification Search
CPC ..... B64G 1/10; B64G 1/1021; G01S 13/9029; G01S 13/9052; G01S 13/9017; G01S 13/904

See application file for complete search history.

(56) References Cited

U.S. PATENT DOCUMENTS

| | | |
|---|---|---|
| 6,283,415 B1 | 9/2001 | Rosen |
| 2010/0008622 A1 | 1/2010 | Cho et al. |
| 2010/0086228 A1 | 4/2010 | Cho et al. |
| 2012/0056780 A1 | 3/2012 | Antonik et al. |
| 2014/0266869 A1 | 9/2014 | Liu et al. |
| 2019/0033891 A1 | 1/2019 | Giraud |
| 2021/0078942 A1* | 3/2021 | Reedy ................... C07C 259/06 |
| 2021/0088651 A1 | 3/2021 | Neto et al. |

FOREIGN PATENT DOCUMENTS

| | | |
|---|---|---|
| WO | 2020157802 A1 | 8/2020 |
| WO | 2020/208578 A1 | 10/2020 |
| WO | WO 202015800 A1 | 9/2021 |

OTHER PUBLICATIONS

PCT Written Opinion and Search Report issued in related PCT Application No. PCT/EP2022/069402 dated Dec. 5, 2022.
Great Britain Office Action issued in priority application GB 2110156.3 dated Jan. 17, 2022.
Great Britain Office Action issued in priority application GB 2110156.3 dated Oct. 25, 2023.
Great Britain Office Action issued in priority application GB 2110156.3 dated Jan. 26, 2024.
Chinese Office Action issued in connection with related Chinese Patent Application No. 202280055802.5 dated Aug. 22, 2024.
Japanese Office Action issued in connection with related Japanese Patent Application No. 2024-502046 dated Sep. 6, 2024.
Israel Office Action issued in connection with related Israel Patent Application No. 310139 dated Sep. 30, 2024.
Office Action received for corresponding Chinese Patent Application No. 202280055802.5 dated Jan. 25, 2025.
Korean Office Action issued in connection with related Korean Patent Application No. KR 10-2024-7003937 dated Sep. 5, 2024.
Third Chinese Office Action for Application No. CN 202280055802.5, dated Jul. 10, 2025, 14 pages (with English 1 translation).

* cited by examiner (b) Figure 7 patch A with dwell time of 14s (7 looks)

(a) Figure 7 patch A with dwell time of 2s (1 look)

(b) Figure 7 patch B with dwell time of 25s (12 looks)

(a) Figure 7 patch A with dwell time of 25s (12 looks)

Colour composite of long dwell acquisition looks (video frames)

SATELLITE WITH SPOT LIGHT MODE FOR EXTENDED DURATION TARGET IMAGING

This application is the National Stage filing under 35 U.S.C. 371 of International Application No. PCT/EP2022/069402 filed on July 12. 2022, which claims priority to GB Application No. 2110156.3 filed on Jul. 14, 2021, the contents of which are hereby incorporated by reference herein in their entirety to the extent permitted by law.

The invention is in the field of satellites and satellite systems with SAR imaging capability.

BACKGROUND

A Synthetic Aperture Radar (SAR) system may obtain range resolution through the nature of its pulse waveform. The azimuth (along track) resolution is constructed by looking at a ground site, or target area on the earth, over a range of angles. Usually a SAR obtains finer azimuth resolution than range (side-to-side) resolution. This finer resolution is averaged together to make a pixel with the same dimension as the range resolution but with better signal to noise ratio. This is called multilooking.

Operators of SAR systems are constantly aiming to improve the accuracy and range of information that can be provided by satellite imagery.

Some embodiments of the invention described below solve some of these problems. However the invention is not limited to solutions to these problems and some embodiments of the invention solve other problems.

SUMMARY

This summary is provided to introduce a selection of concepts in a simplified form that are further described below in the detailed description. This summary is not intended to identify key features or essential features of the claimed subject matter, nor is it intended to be used to determine the scope of the claimed subject matter.

Some embodiments of the invention provide a satellite, a ground station, a satellite system or a method of processing raw SAR data in which extended dwell times are used to obtain the raw data. In the case of the satellite, the extended dwell times may be achieved by mechanical steering of the satellite.

In a first aspect there is provided in the following a satellite for operation in orbit around Earth comprising: a propulsion system, an attitude determination and control system "ADCS", one or more radar antennas or antenna arrays, synthetic aperture radar "SAR" image acquisition apparatus, and a communication system configured to send and receive signals to and from one or more ground stations on Earth, wherein the ADCS is configured for mechanically steering the satellite in the azimuth direction to prolong a dwell time, during which a selected target is visible from the satellite, as the satellite orbits over the target.

The ADCS may achieve a greater range of viewing angles than is possible for example by electronic beam steering. This ability may be enhanced by the use of a small agile satellite as described further below. In some embodiments that range of angles is at least from −0.75 degrees to +0.75 degrees, it may be from −10 degrees to +10 degrees, or from −23 degrees to +23 degrees, or from −30 degrees to +30 degrees, or from −40 degrees to +40 degrees.

In some embodiments the ADCS may be configured to slew the satellite in the azimuth direction at up to 1 degree per second using mechanical steering.

In another aspect there is provided in the following ground station for receiving SAR data from a satellite in orbit around Earth and processing the data to form one or more images of a target on Earth, the ground station comprising at least one processor configured to: receive raw SAR data from the satellite, the raw data comprising pulse recordings resulting from the reflection of radio energy pulses transmitted from the satellite, from a target on Earth; wherein the radio energy pulses correspond to a range of angles in the azimuth direction achieved by steering the satellite in the azimuth direction to prolong a dwell time over the target.

The processor at the ground station may be configured to process raw SAR data from any of the satellites described here. The raw SAR data may be processed in a number of ways to provide image information including but not limited to forming multilook images, compiling video sequences and colour coding images, described further below.

In another aspect there is provided a method of processing raw SAR data, for example received from any of the satellites described here, which may be performed at a ground station. Thus computing equipment at a ground station may be configured to implement any of the methods described here.

Embodiments of the invention also provide a computer readable medium comprising instructions, for example in the form of an algorithm, which, when implemented in a computing system forming part of a satellite operation system, cause the system to perform any of the methods described here.

Features of different aspects and embodiments of the invention may be combined as appropriate, as would be apparent to a skilled person, and may be combined with any of the aspects of the invention.

BRIEF DESCRIPTION OF THE DRAWINGS

Embodiments of the invention will be described, by way of example only and with reference to the following drawings, in which.

Figure 1:
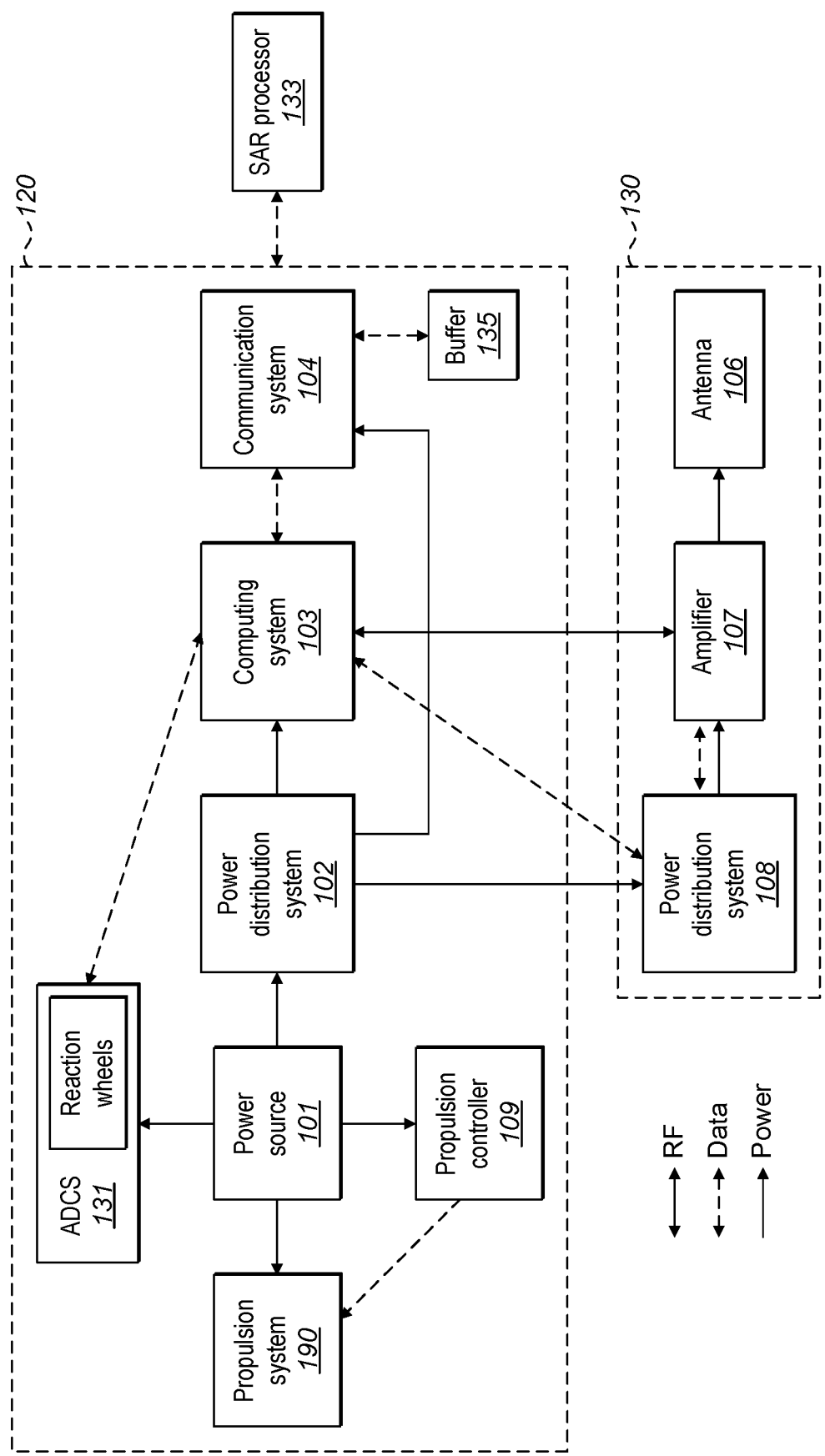
FIG. 1 is a schematic diagram representation of the components of a satellite according to some embodiments of the invention.

Common reference numerals are used throughout the figures to indicate similar features.

DETAILED DESCRIPTION

Embodiments of the present invention are described below by way of example only. These examples represent the best ways of putting the invention into practice that are currently known to the applicant although they are not the only ways in which this could be achieved.

Embodiments of the invention provide a satellite and methods of operating a satellite. Embodiments of the invention are particularly applicable to the class of satellites known as micro satellites. These are designed to have a weight in the range 50 kg-to 250 kg.

A satellite according to some embodiments of the invention will firstly be described.

FIG. 1 is a schematic diagram representation of the components of a satellite, for example a micro satellite, according to some embodiments of the invention. One-directional solid arrows between components are used to indicate power connections, two-directional solid arrows are used to indicate RF signal connections, and dotted lines are used to indicate data connections.

Some components are located at the satellite body, indicated by rectangle 120, and some are located at a wing, indicated by rectangle 130. The satellite shown in FIG. 1 comprises a power source 101 and a power distribution system 102. The power source 101 and power distribution system 102 supply power to a propulsion system 190, propulsion controller 109, attitude determination and control system "ADCS" 131, computing system 103, buffer 135, and a communication system 104. The buffer 135, although shown as separate items, may be comprised in the computing system 103. The propulsion controller 109 is shown here as a separate item but in practice it may form part of the computing system 103. The propulsion controller may be configured to implement methods according to some embodiments of the invention, either through the use of control software implemented in one or more processors comprised in the propulsion controller 109 or on in response to received instructions, for example from the computing system. Where the instructions are transmitted from the computing system 103, the computing system may be considered to comprise a propulsion controller. One of the functions of the propulsion controller 109 may be to output control signals to ion sources and electron sources of thrusters in the propulsion system 190.

The power source 101, power distribution system 102, computing system 103 and communication system 104 are collectively referred to in the art as the satellite "bus". The communication system 104 may include one or more antennas, for example located on the satellite body. Alternatively the communication system 104 may send and receive signals via one or more antennas on a wing 130.

The power source 101 and power distribution system 102 shown in FIG. 1 may also supply power to one or more sensors, not shown, which may be located at the body 120. The sensors form part of what is known in the art as the satellite "payload". The number and variety of sensors may vary according to the intended use of the satellite.

In the case of an earth observation satellite, the payload may include one or more radar antennas 106 or antenna arrays, which may be located at one or more wings 130. Each antenna 106 or antenna array may have an associated amplifier 107, supplied with power via a power distribution system 108 from power source 101, for example via power distribution system 102. Both power distribution systems 102 and 108 may comprise control logic as is known in the art.

The antennas 106 together with amplifiers 107 and power distribution system 108 collectively form image acquisition apparatus of the satellite, as is known to those skilled in the art. They may perform functions other than the acquisition of image data.

In a typical satellite each antenna may comprise a phased array antenna. The effective radar aperture depends on the area of the one or more antennas, in other words the greater the total antenna area the greater the aperture. The aperture is also referred to in the art as the satellite receive window.

The amplifier 107 has a two way data communication link with the computing system 103, in the illustrated example via the power distribution system 108, and may be configured to send data to the computing system 103 such as data relating to received radar signals. The data may be processed by the communication system 103, for example to generate images as described elsewhere here, which may then be output to the communication system 104 for onward transmission. In the system illustrated in FIG. 1, raw data is output by the computing system 103 to the communication system 104 for processing by a remote computing system. In FIG. 1, a SAR processor 133 may be located at a ground station, for example, or in another processing location. The computing system 103 may send data to the amplifier 107, for example via the power distribution system 108, such as operating instructions, requests for data and other signals as will be familiar to those skilled in the art.

Raw SAR data is stored in the satellite in memory, for example buffer 135. In an example, 30 seconds of imagery can be stored at full resolution (bandwidth). More can be stored at lower resolution (e.g., 60 seconds at half resolution). In an example, a micro satellite has a 150 MBs download link. At this data rate it takes about 3 minutes to download the 30 seconds of full resolution imagery data.

During operation, for example during spotlight mode, around 5000 pulses per second may be transmitted. This means that 27 pulses might be in the air at any given time.

The communication system 104 may communicate with earth stations or other satellites using radio frequency communication, light, e.g. laser communication, or any other form of communication as is known in the art.

Figure 2:
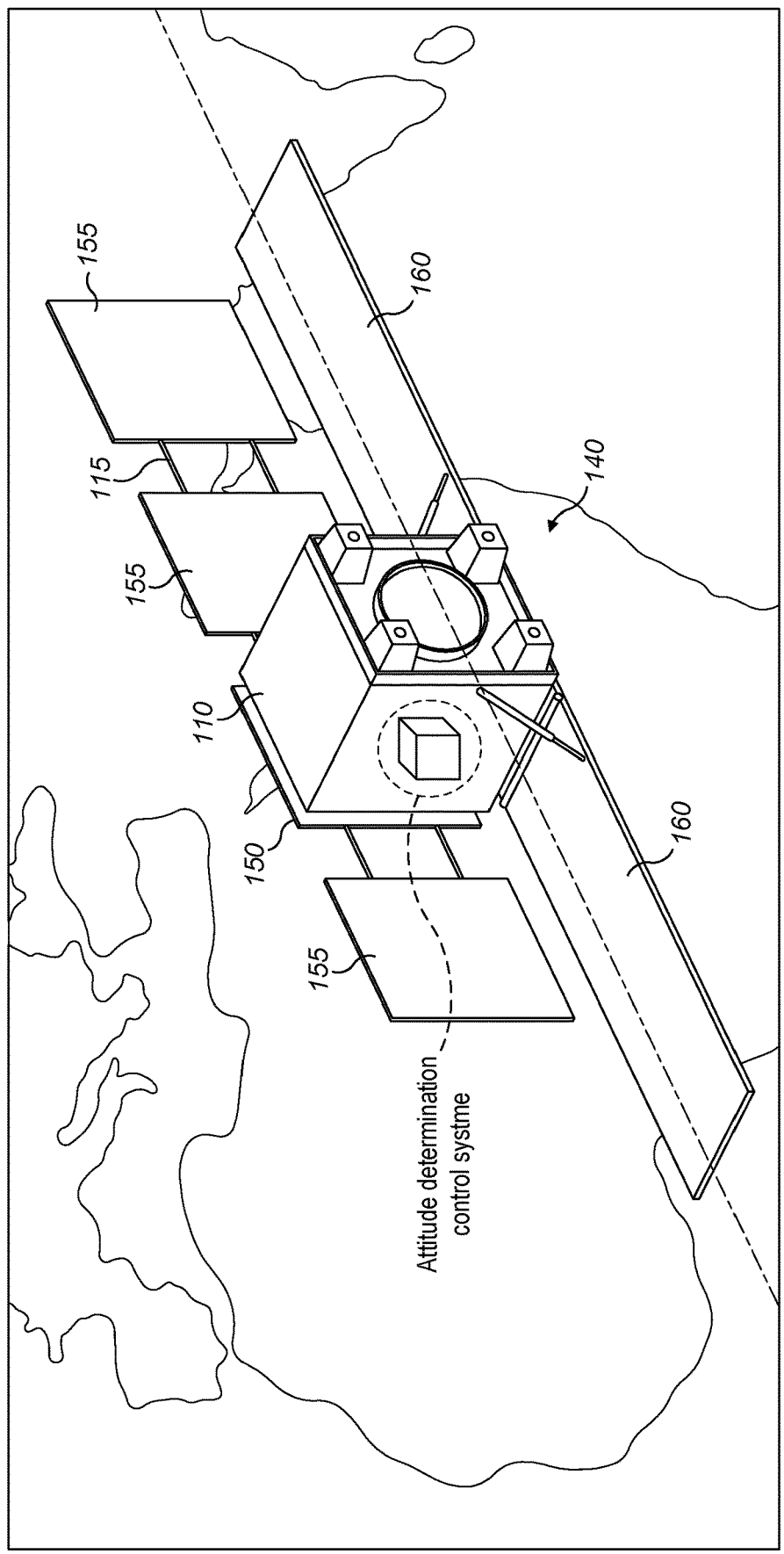
FIGS. 2, 3 and 4 show different perspective views of a satellite, in accordance with some embodiments of the present invention.
Figure 3:
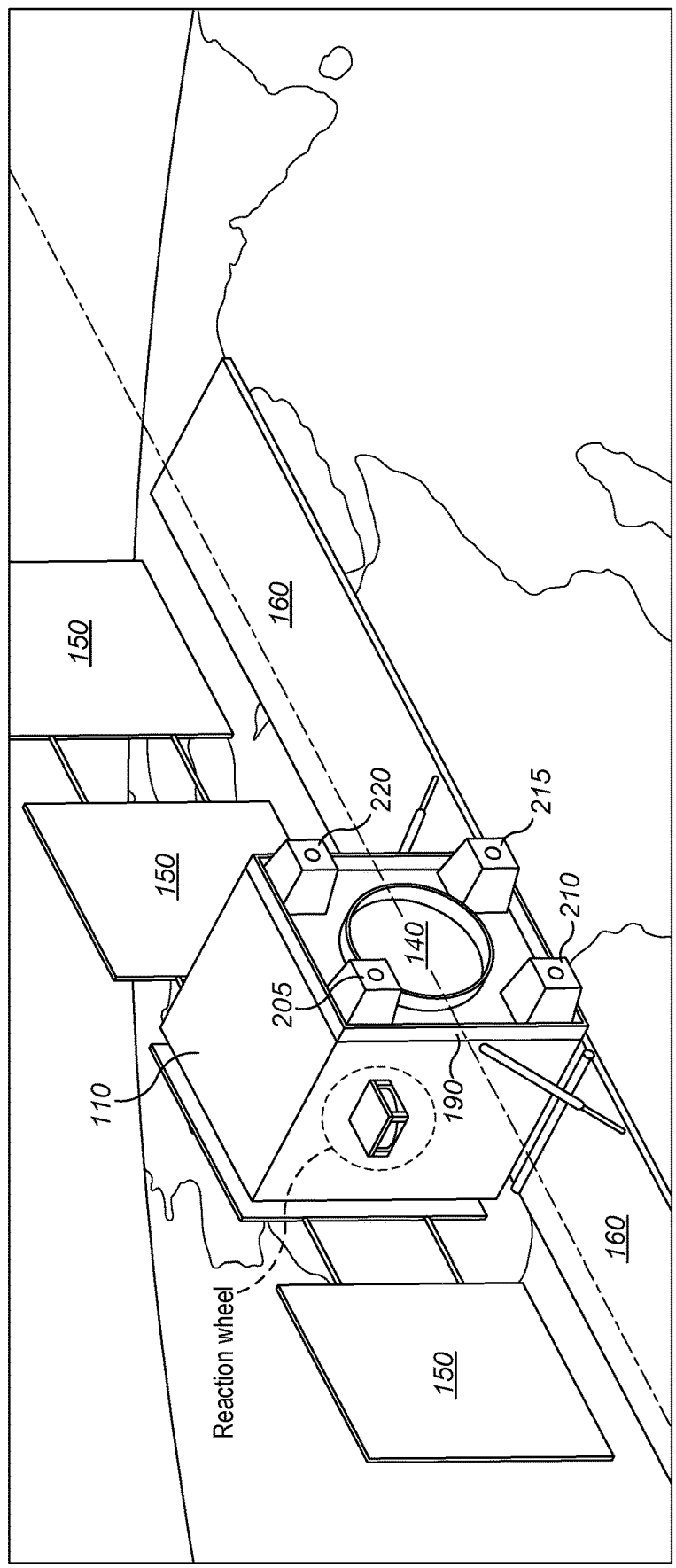

FIGS. 2 and 3 are perspective views of a satellite 140, which may be a micro satellite, which may comprise the components of FIG. 1, shown in FIG. 3 orbiting in space. The satellite of FIG. 2 comprises a body 110, in which some of the body 120 components of FIG. 1 may be housed, or on which some of the components of FIG. 1 may be mounted. The body 110 is also referred to in the art as a "bus" since it may house or support the bus components. Body 110 may additionally house one or more batteries. Body 110 may be partially enclosed, for example to house and protect components. A housing may provide surfaces on which components may be mounted. In the example of FIG. 2 a solar panel 150 is mounted on one rectangular surface of the body 110 and additional solar panels 155 are attached to panel 150 by a struts 115.

The satellite 140 comprises a generally planar structure extending from the body 110 in two opposing directions to provide two "wings" 160. The structure comprising wings 160 is shown to be mounted on or adjacent to a rectangular surface of the body 110. As shown most clearly in FIG. 4 it is formed in sections so as to be folded for transport and unfolded when deployed. The body 110 and wings 160 are collectively referred to here as the spacecraft frame and have electrical properties which are described further below.

One or more antennas as described above may be mounted on the satellite "wings". One antenna array 180 is shown removed from the satellite in FIG. 4 for the purpose of illustration and may comprise a patch antenna as is known in the art. Other components may be mounted on the wings as is known in the art including power distribution components and amplifiers, examples of which are described in earlier patent application GB-A-2598793.

The satellite 140 is provided with a propulsion system 190 for manoeuvring the satellite with a generated thrust. The propulsion system 190 is most clearly visible in FIG. 3 and in this embodiment is mounted on the body 110 on the surface opposite to the solar panels 150.

As shown in FIG. 3, the propulsion system 190 comprises a plurality of thrusters 205, 210, 215, 220 that produce thrust for manoeuvring the satellite 140 when required. The plurality of thrusters 205, 210, 215, 220 shown in FIG. 3 are positioned at the corners of one side of the body 110 and may be equally spaced apart. However, in some embodiments of the present invention, the propulsion system may have a different configuration.

The thrusters 205, 210, 215, 220 are generally operated to maintain the satellite in a particular orbit. For example the thrusters may be used to propel the satellite in a particular direction with respect to the surface of the earth.

Figure 4:
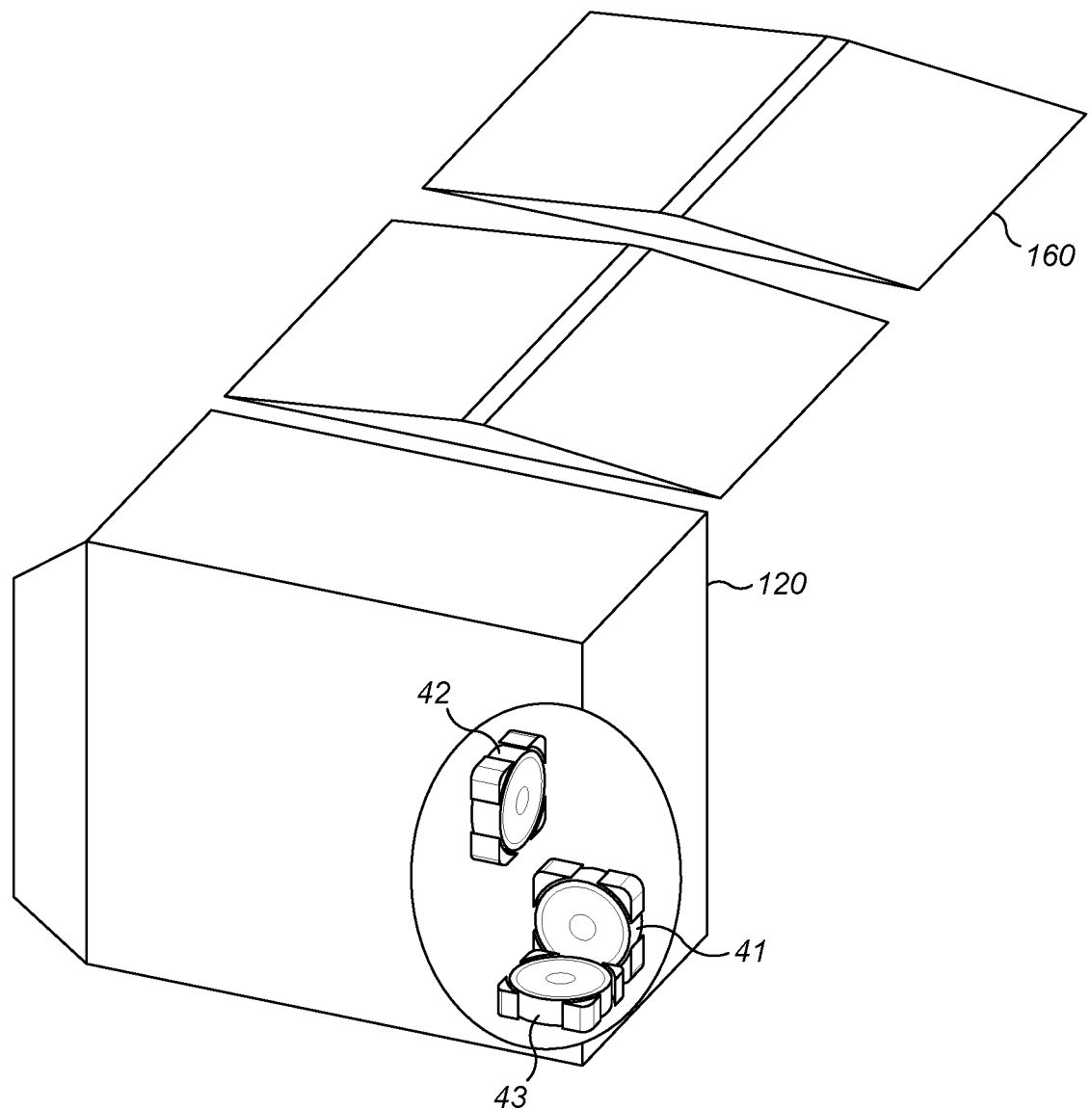

The ADCS 131 is usually located in the satellite body 120 and is used to control the orientation of the satellite. ADCS may be implemented in a number of ways. The ADCS 131 is shown in the figures to comprise a set of reaction wheels, one of which is indicated schematically in FIG. 3. The reaction wheels are usually, but not necessarily, located in the satellite body 120. FIG. 4 shows a set of three reaction wheels 41, 42, 43 located in the satellite body 120. Reaction wheels are sometimes also known as momentum wheels.

In the satellite described here, an ADCS is used to mechanically steer the satellite to maintain a target on the surface of the earth within the radar aperture, in other words in sight of the satellite, for a longer period than the target would be visible without mechanical steering as the satellite travels in its orbit. This "spotlight mode" is used for example to dwell on a particular target. Traditionally this has been achieved using electronic beam steering, and only for much shorter dwell times (e.g., less than 10 seconds). The dwelling of satellite acquisition apparatus over a target is also referred to in the art as "staring".

Reaction wheels 41, 42, 43 function by using an electric motor to spin a wheel inside the spacecraft body 120. By conservation of angular moment, since there are no external forces in space, spinning the wheel in one direction causes the spacecraft to rotate in the opposite direction. Using reaction wheels is a well-known way of orienting spacecraft such as satellites.

In an example, three reaction wheels are positioned inside a spacecraft body, one for orienting the satellite in each axis. Thus reaction wheels 41, 42, 43 are shown to have orthogonal axes.

In another example, four or more reaction wheels may be used in order to have better control over various aspects of the satellites dynamics, such as slew rate (how fast the satellite can turn) and fine positioning control, particular for satellites with higher moments of inertia. This technique may contribute to the ability to dwell on a certain point on the earth's surface, discussed further elsewhere here, but is not essential.

Various classes of satellites are currently in orbit around the earth, generally defined by ranges of weights, although the boundaries between the classes are somewhat fluid and arbitrary:

Cube satellites: 1 kg-10 kg
Micro satellites: 50 kg-to 250 kg
Small satellites: 500 kg
Regular satellites: 800-1200 kg.

Reaction wheels are rated in terms of their "momentum capacity", which has units of nms (newton-metre-seconds). The slew rate is related to the speed of the wheel and the inertia of the satellite system. A satellite having a particularly low mass has a much lower moment of inertia than traditional larger SAR satellites. A suitably low mass may be under 1000 Kg, for example under 500 Kg, under 250 Kg, between 50 Kg and 250 Kg, or under 100 kg.

Very small cube satellites do not at present have the capability to carry a current SAR payload. Heavier satellites are generally less agile due to their higher inertia. Embodiments of the satellite and operating methods described here have been successfully implemented in a micro satellite.

Some of the methods to be described further here benefit from reaction wheels within a particular rating range. A suitable range for example for micro satellites can be 0.5 to 2.5 nms. Reaction wheels with a rating of 1 nms have been successfully trialed. This has enabled slew in the range of 1°/second, which is sufficient to track a spot on the ground and to implement any of the methods described here without consuming too much power. Thus in any of the satellites described here, the ADCS may be configured to slew the satellite in the azimuth direction at up to 1 degree/second using mechanical steering. Additionally or alternatively the ADCS may be configured for a dwell time of up to 60 seconds.

Larger satellites are known to use reaction wheels of the order of 10 nms, but they are not currently able to achieve slew rates sufficient for the dwell times discussed further here due to the large mass of the satellites and the resulting high rotational inertia, and they also consume much more power than the smaller reaction wheels.

In an example, the satellite is orbiting Earth in a low-earth orbit. A low-earth orbit can be from 160 km to 1000 km above the surface of the Earth. Examples of Earth-observation satellites based on SAR according can have orbits of between 450 km and 650 km above the Earth. In an example according to the current invention, a satellite has an orbit that is 550 km above the Earth's surface. At an orbit of 550 km above the Earth, for example, the satellite is effectively traversing the ground at about 7.5 km/s, or 27,000 km/h. Most satellites in this this orbit will traverse the Earth at a speed that is in the range of 7-8 km/s.

In some embodiments, in order to dwell on and keep the SAR antenna pointed to a point on the earth, the micro satellite may be designed to be able to rotate with a slew rate ability of the order of 1°/sec. This has not been achievable mechanically with traditional satellites. However, according to some embodiments of the invention, a satellite such as a micro satellite can slew at a speed necessary to maintain pointing at a spot on Earth for about 10 minutes from horizon to horizon. However, at the extremes of this range the distance to the spot or target being imaged is too far to get a good SAR image, so there is a smaller practical dwell time. In an example, a satellite can produce 12 images of a 6 km×6 km area with a dwell time of 25 seconds. In an example, a satellite can point to a single point on Earth and achieve good images for a dwell time of up to 60 seconds.

Figure 5:
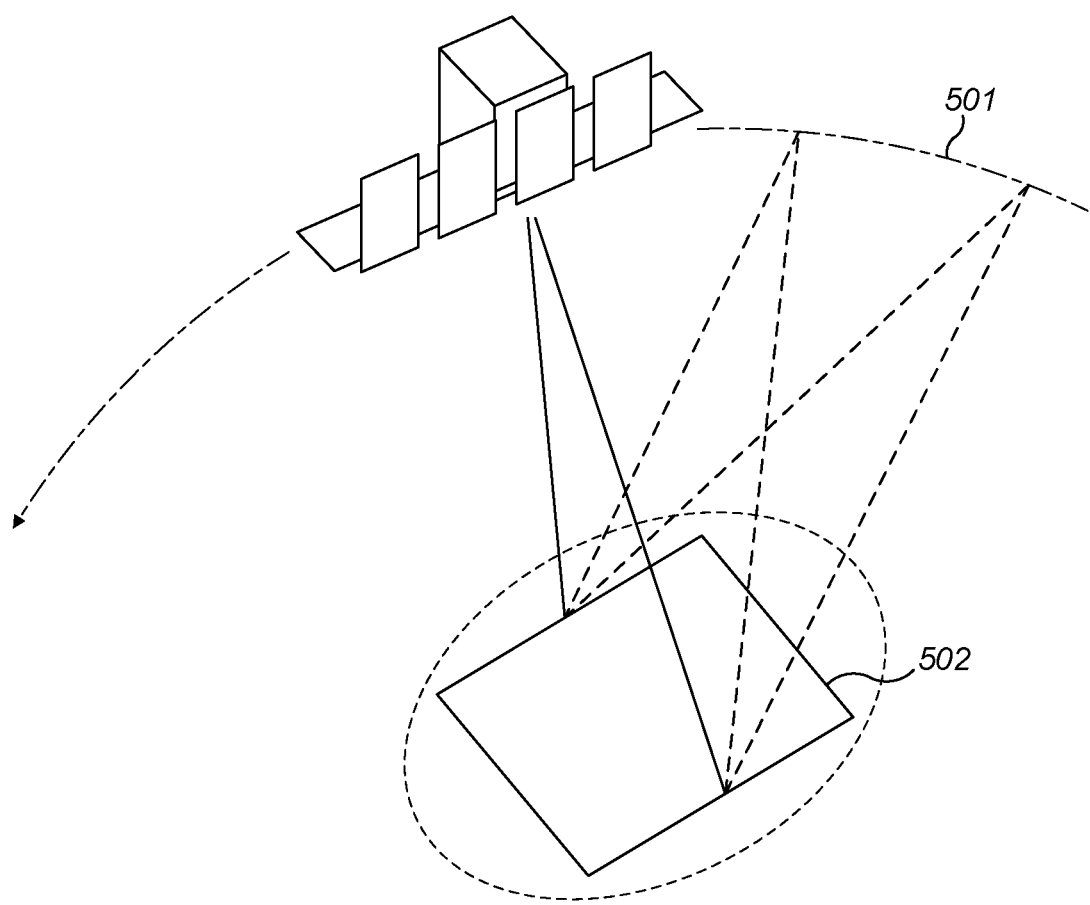
FIG. 5 shows schematically a satellite operating in spotlight mode.

FIG. 5 is a schematic diagram of a satellite operating in spotlight mode. The curved line 501 indicates in exaggerated form the variation of angle of the satellite in order to extend the dwell time over a target 502, in this case an area on the earth.

Figure 6:
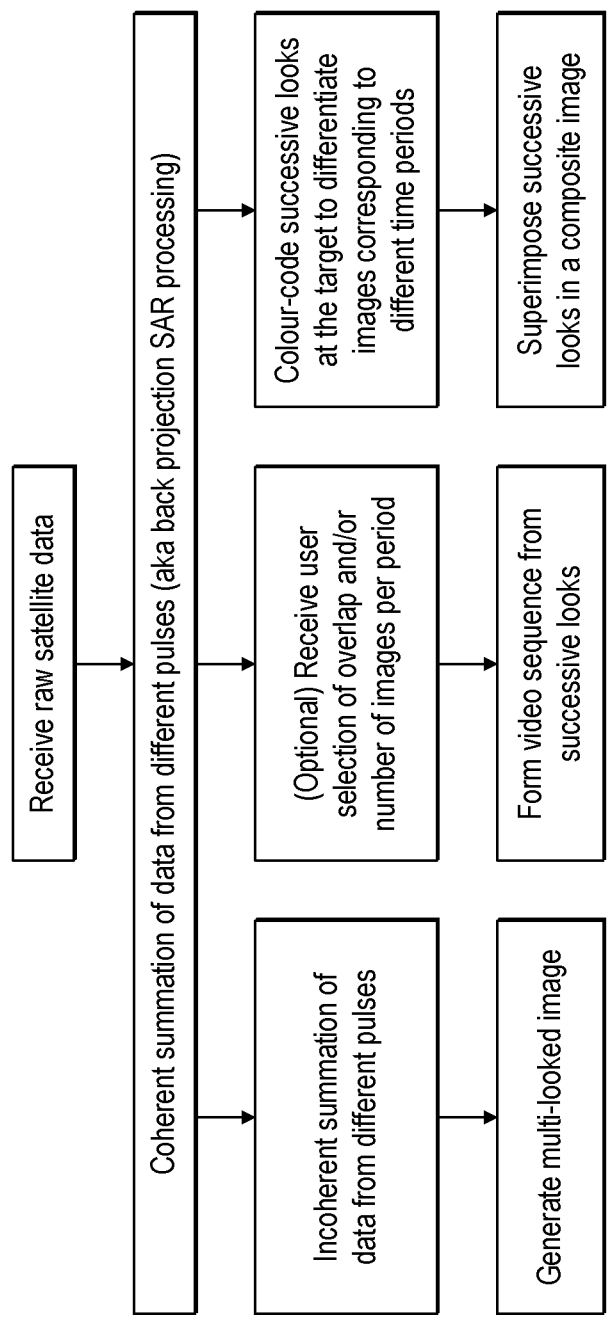
FIG. 6 is a flow chart illustrating possible configurations of a ground station according to some embodiments of the invention.

FIG. 6 is a flow chart illustrating methods of processing raw satellite data, such as may be performed at a ground station according to some embodiments of the invention. The method may be performed using one or more processors, as is known in the field of SAR image data processing. In some embodiments a single processor may perform the operations shown in FIG. 6. In other embodiments the separate flow maybe performed in separate processors.

The raw image data, or the data to be processed to form images, comprises recordings of pulses received at the satellite, as a result of reflections from a target, e.g. area on the ground, of radio energy pulses transmitted from the satellite. Data from a plurality of pulse recordings is processed to form a series of images or "looks". In other words, a "look" comprises a formed image from a number, greater than one, of pulses.

A challenge with the formation of a look is to ensure that data relating to the same point on the ground is used to form a pixel in an image or look. According to some embodiments of the invention, this may be achieved by a technique known as back projection SAR processing, in which data from different pulses is summed coherently, for example summing amplitude and phase information. One reason for performing coherent summation is to improve the resolution in the final image.

The coherently summed data may be further processed in a number of different ways, three of which are illustrated in FIG. 6.

In some embodiments of the invention, the mechanical antenna steering in the azimuth direction is used to increase the illumination time, resulting in an increased synthetic aperture and therefore increased azimuth resolution. In other words, multiple looks, produced for example as a result of back projection SAR processing, may be combined to form a single image. For this purpose consecutive looks, or coherently summed data, may be incoherently summed. In incoherent summing, amplitude information is summed and the mean is used to form the multi-looked image. Phase information is not summed.

Figure 7:
FIG. 7 shows an example of a multi-looked image obtained according to some embodiments of the invention.
Figure 8:
FIGS. 8(*a*) and 8(*b*) show examples of patch single and multi-look images using dwell times of 2 seconds and 14 seconds respectively.
Figure 8:
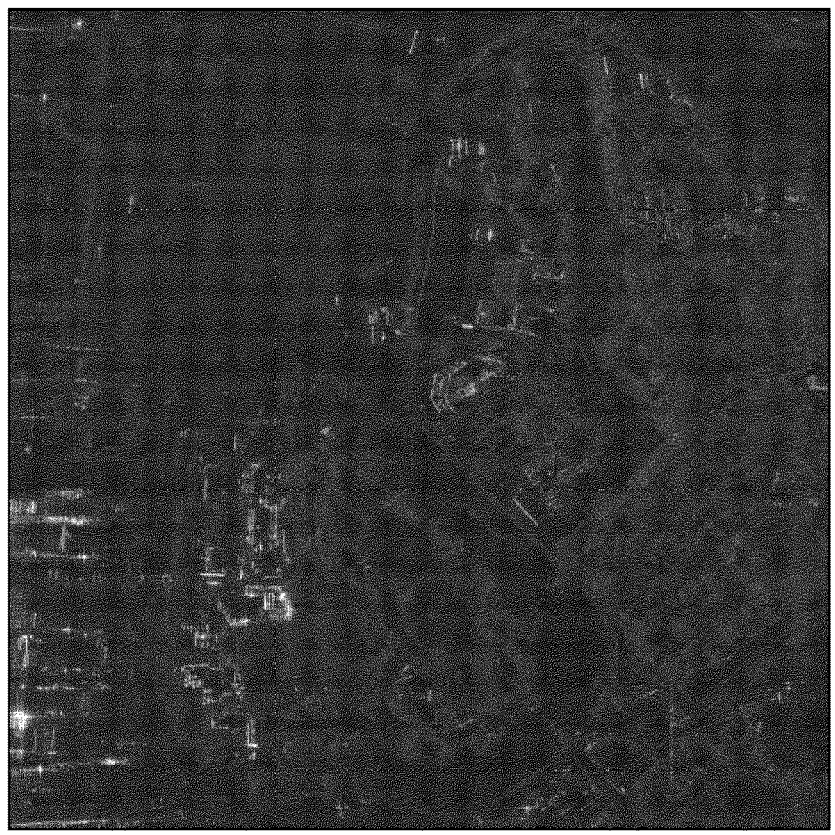
Figure 9:
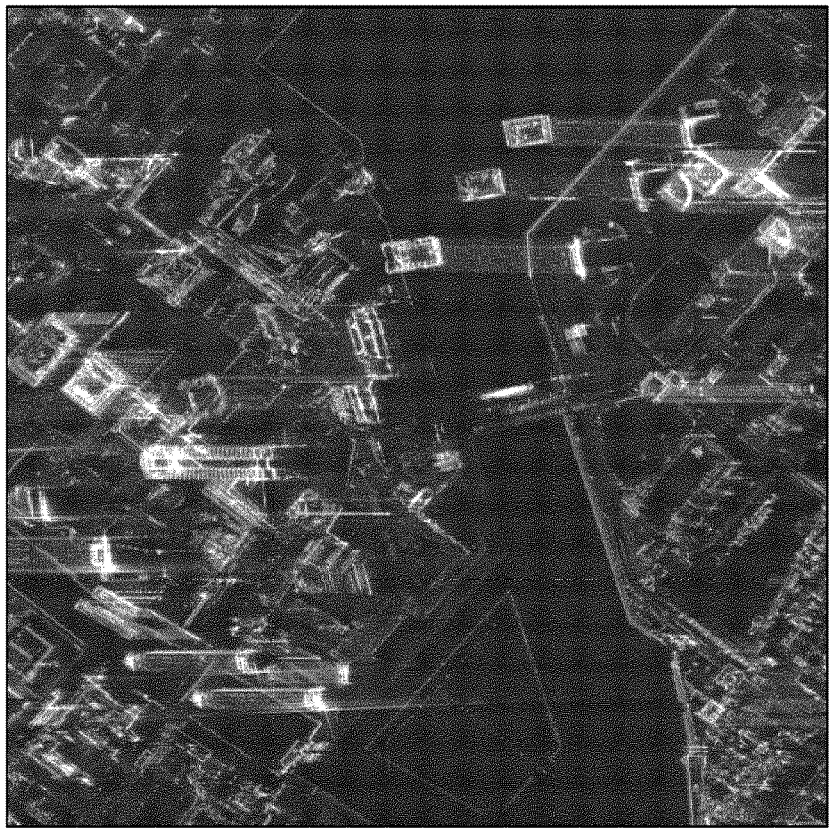
FIGS. 9(*a*) and 9(*b*) show examples of patch multi-look images using 25 second dwell times.
Figure 9:

FIG. 7 shows an example of a multi-looked image with 12 looks and ground range detected image with a resolution of 0.5 m azimuth and 0.5 metres in slant range. Specifically the image was acquired with long dwell staring Spotlight mode from a micro-satellite SAR constellation over the downtown region of Tokyo Japan (size approximately 6 km×6 km). With the increased dwell time of a staring spotlight acquisition, achieved by mechanically steering the satellite in its orbit, more looks of ultra-high resolution images can be produced and incoherently summed up, leading to an increase in SCR (signal to clutter ratio) and suppression of speckle noise. This is illustrated in FIGS. 8(a) and 8(b) and FIGS. 9(a) and 9(b).

Figure 10:
FIG. 10 is a further example of a multi-looked image generated from multi-looking in azimuth to reduce speckle.

FIG. 10 is a further example of a multi-looked image generated from multi-looking in azimuth to reduce speckle. This is a small subset of a much larger scene is shown on the right, where much detail can be seen together with little speckle which considerable eases interpretability in complex scenes.

Figure 11:
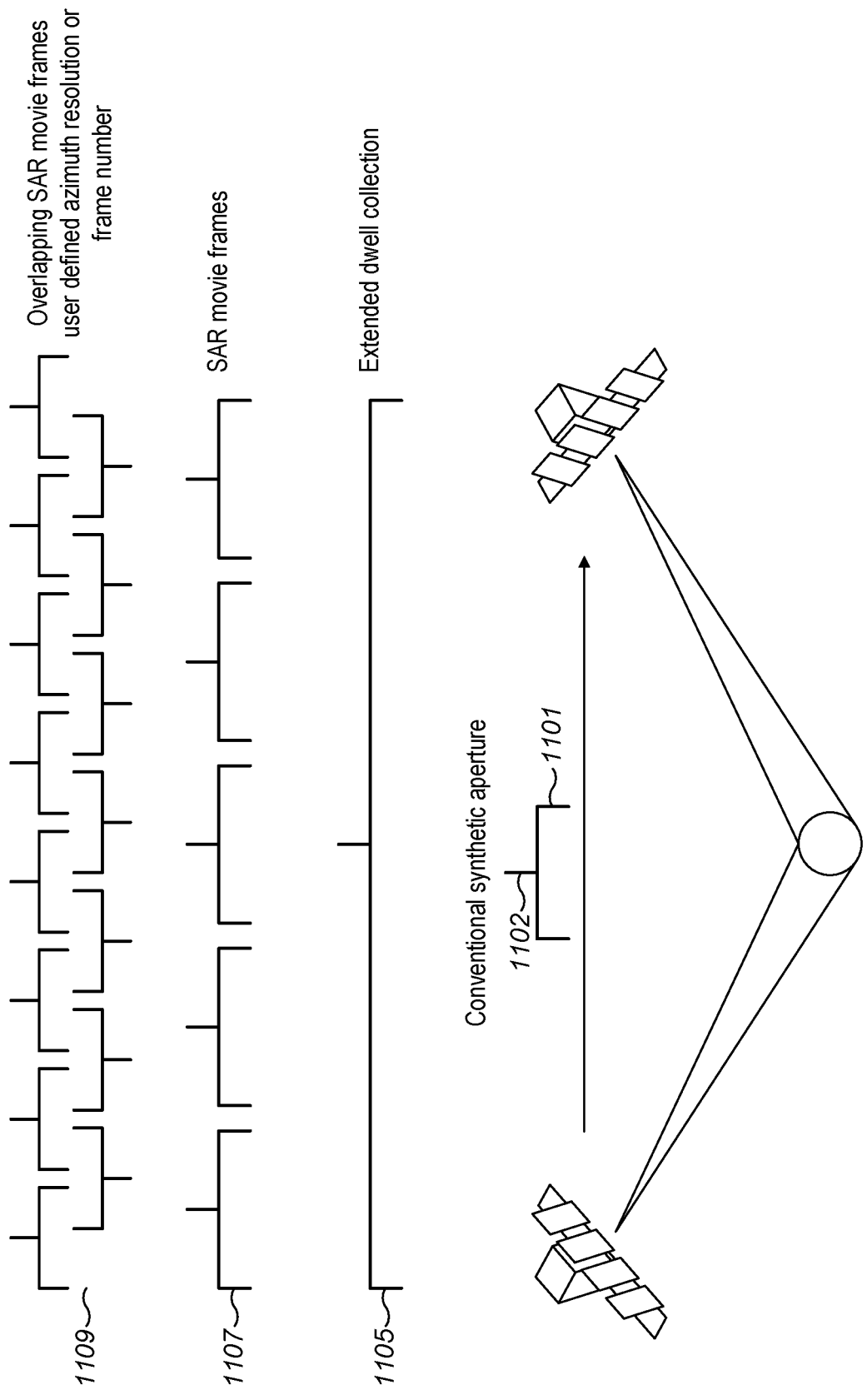
FIG. 11 schematically illustrates generation of multi-look and overlapping images according to some embodiments of the invention.

Referring back to FIG. 6, in some embodiments of the invention, different looks may be used as frames in a video in order to interrogate the ground as a function of time. This is illustrated schematically in FIG. 11. The resulting SAR movie provides a unique way to observe movement and other dynamic activity on the Earth's surface, such as the movement of ships and other vehicles The lower diagram in FIG. 11 shows, in exaggerated form, the variation of angle of a satellite in order to achieve an extended dwell time on a target. The extent of a conventional synthetic aperture, with no mechanical steering, is indicated at 1101, with the upstanding line 1102 indicating the centre of the aperture. The possible extended dwell collection time (and associated extended angular range) is indicated at 1105. A conventional synthetic aperture corresponds to a dwell time of about 10 s. Extended long-duration spotlight SAR according to some embodiments of this invention has been demonstrated up to 25 s. In principle a satellite can remain pointing at a spot up to 60 s or more. However, processing of the additional data would require correspondingly more on-board storage.

To give a specific example for the purpose of illustration only, for a satellite travelling 7.5 km/s at 550 km above the Earth, ignoring the curvature of the Earth, this means in 30 seconds the satellite will travel 225 km away from directly over the target. To still be pointing directly at the same point on Earth for the whole 30 second period an angle range of about 23 degrees is required. Different embodiments of the invention may use different ranges of angles. This may depend on factors such as but not limited to the ability of the mechanical steering and the capacity of the satellite on board memory, since data is usually downloaded in batches when passing over a ground station A set of non-overlapping movie frames is indicated at 1107, from which it can be seen that successive looks may be compiled to form a video sequence. Diagram 1109 demonstrates that a movie may be created from overlapping frames. Notably the centres of the apertures of successive looks are consecutive and therefore the overlapping frames may appear as consecutive images in a video sequence.

The generation of the overlapping images may be achieved with a suitable image formation algorithm that can form frames that overlap in time. Each frame may have an observation time that corresponds to the centre of its synthetic aperture. By overlapping frames, the centre aperture observation times for each frame can be closer together. This means that an arbitrary number of frames can be formed in the video and a user defined resolution can be specified for each frame.

Figure 12:
FIG. 12 shows a composite of long-dwell acquisition video frames obtained according to some embodiments of the invention.

FIG. 12 shows an example of a composition of many looks (video frames) taken during a long-dwell acquisition which may be rendered as a colour composite. The frames can also be played back at an appropriate frame rate in order to better observe movement within the frame. Very long dwell time staring spotlight imaging enables not only ultra high resolution imaging but as well utilisation of looks as video frames, allowing for observation of dynamical phenomena.

Referring back to FIG. 6, in some embodiments of the invention, successive looks at a target may be colour coded using "chronocolour" to differentiate images corresponding to different time periods. In other words, different frames (or looks) are coloured differently based on the time they were taken (and by implication the angle they were taken from).

They may then be superimposed on top of each other, for example to form a composite image. This is a kind of multi-look image. The superimposition of the colour coded images, in other words combining frames into a single image, enables the use of the colour coding to differentiate features on the ground. With a composite image, features that reflect more-or-less homogeneously over the range of angles being viewed from appear grey because there will be equal contribution from the different colours, whereas objects that reflect more at a given angle or angles will appeared coloured. In some embodiments, the frames (or looks or images) are colour-coded based on time taken, not individual pixels. Then, individual pixels will be appear as different colours in the superimposed image based on the dependence of reflectivity on angle, or if there is movement. Moving objects are less likely to appear grey because they will be shifting locations during the course of the spotlight "stare", and so during superimposition of the images the pixels will be less likely to have an equal contribution of colour from all looks. If the earlier images are coloured red and the later images are coloured blue the object in its starting position during the "stare" will appear red, and will then show up as blue in its final imaged position.

Figure 13:
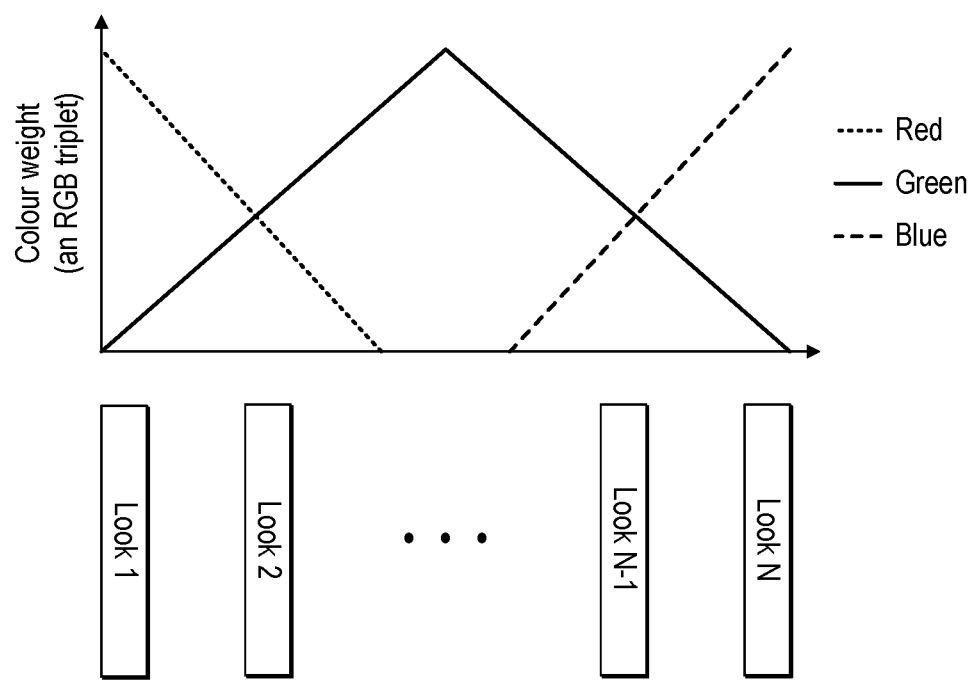
FIG. 13 schematically illustrates time-based colour coding of images according to some embodiments of the invention.

In some embodiments, this colour coding can be achieved by allocating a colour weighting of red/blue/green to successive looks according to the time at which the corresponding data was acquired. This is illustrated schematically in FIG. 13.

Frames can be colour coded so that each frame has different colour value from the colour spectrum. This may be termed "chronocolour". The colours are carefully selected such that an equal quality of each colour adds up to be a grey-scale value (e.g., 3 frames coloured red, green and blue). When each frame is then combined by adding together their colour contributions, items that do not move appear grey and items in the scene that move or are brighter from one orientation will have a dominant colour. This provides an observer to easily identify changing objects or objects that have non-homogeneous radar reflection amounts when imaged from different angles. Typically, non-overlapping frames are used for this type of "chronocolour" image.

Additionally, Each frame can be compared using the python OpenCV Optical Flow library (https://opencv-python-tutroals.readthedocs.io/en/latest/py_tutorials/py_video/py_lucas_kanade/py_lucas_kanade.html) to detect moving targets by subtracting areas within the scene that do not 'flow' or move from one frame to the next. This provides a technique for moving target detection from a space based SAR system.

Figure 14:
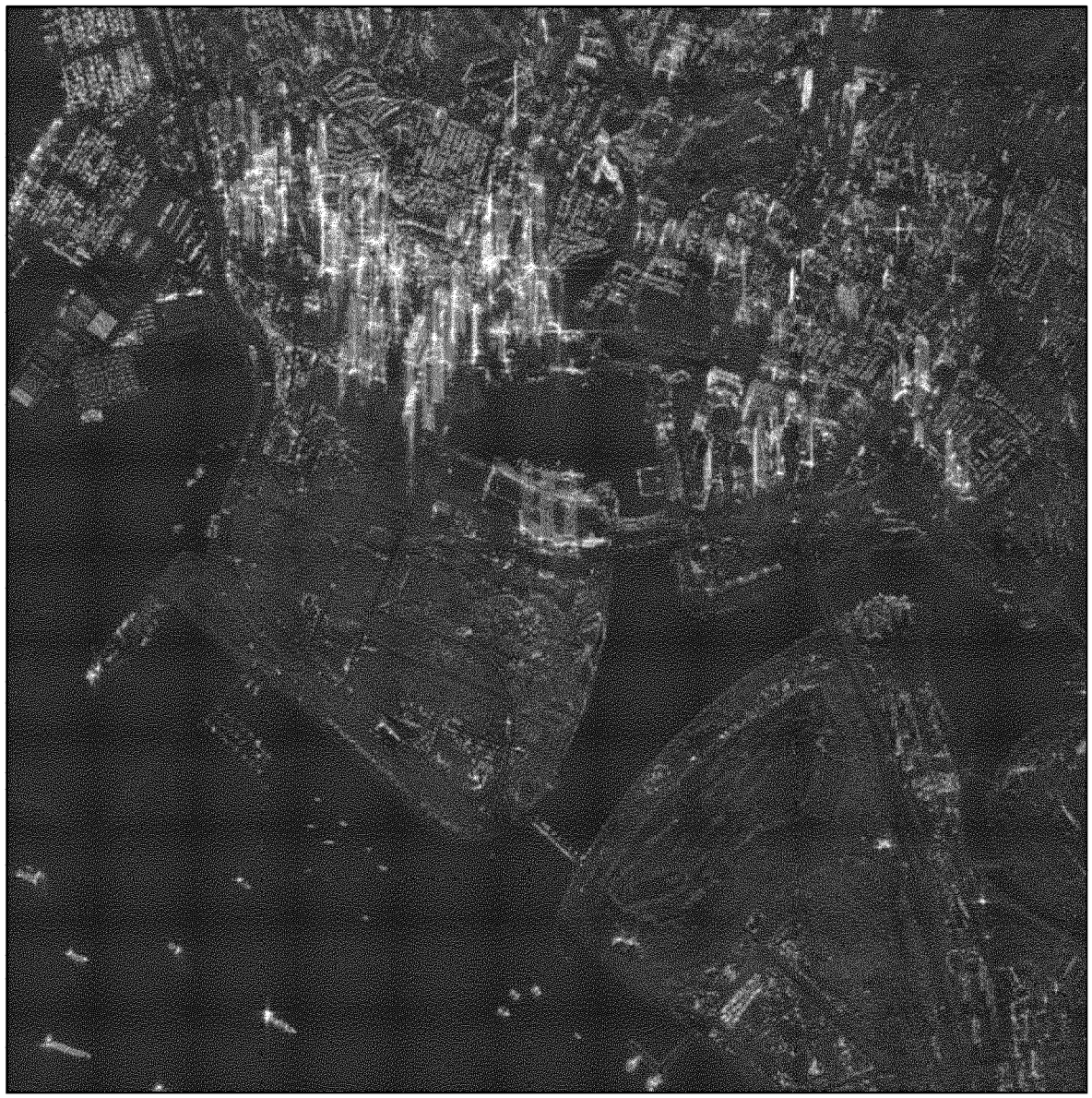
FIG. 14 is an example of a composite of time coloured images obtained according to some embodiments of the invention.

FIG. 14 shows an example of a composite images based on long dwell acquisition looks that are colour-coded according to time taken. In this image, buildings in the top left quadrant of the picture have a distinct colour to them—due to the non-isotropic radar cross section "RCS" of the objects. Due to the regular arrangement (orientation) of buildings, often buildings close to each other will share the same colour. The area of this image is approximately 5 km×5 km.

Figure 15:
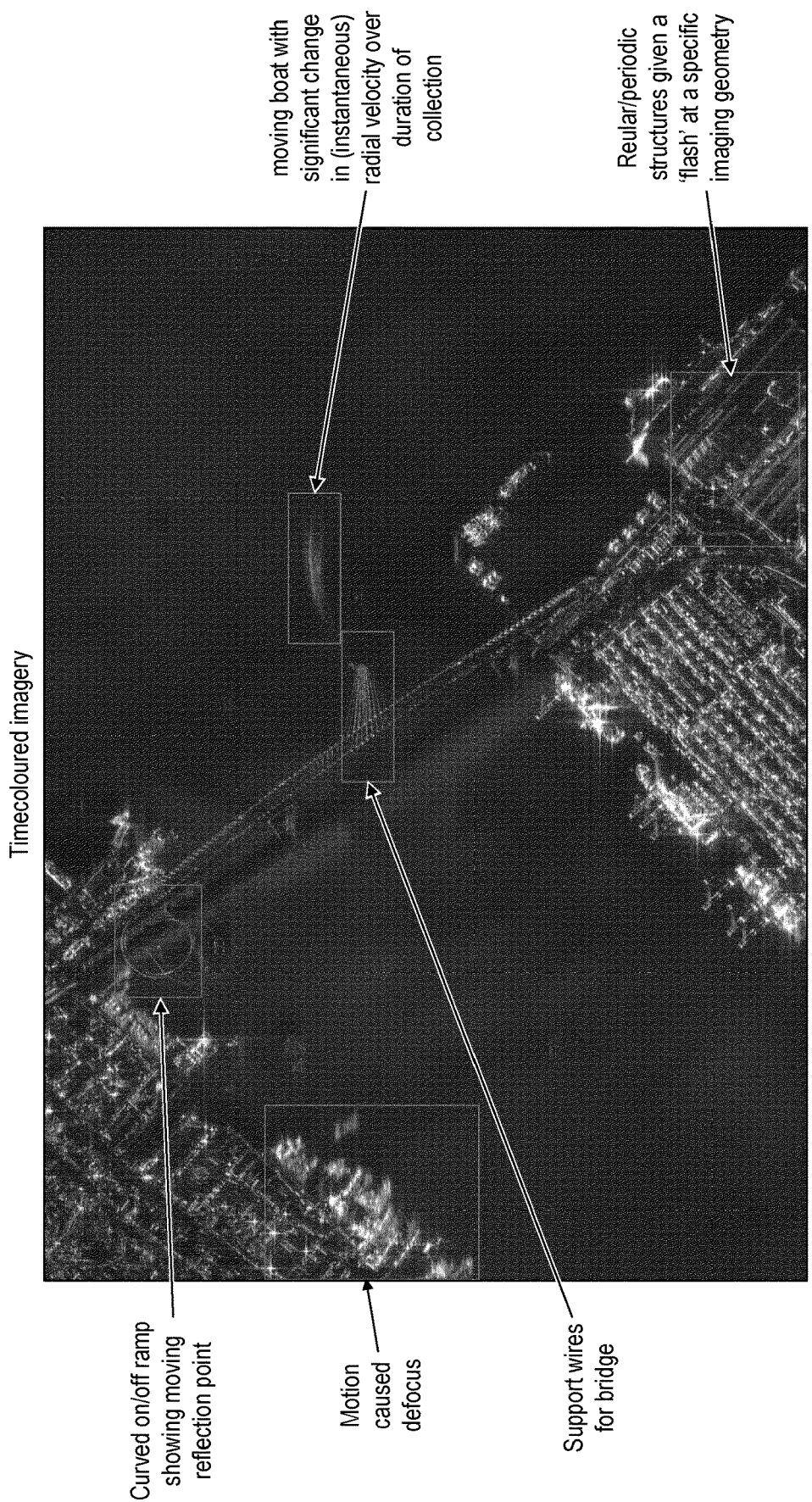
FIG. 15 is an annotated time coloured image obtained according to some embodiments of the invention.

FIG. 15 shows another "chronocolour" example of time-coloured imagery. This image shows in particular how motion can be highlighted by colour. For example, a moving boat can be seen with significant change in (instantaneous) radial velocity over the duration of collection. Just below, it can be seen how man-made structures, in this case the support cables of the bridge, are highlighted by the chrono-colour technique. In traditional imagery they might otherwise be hard to see since the cables are so thin. This technique could also be beneficially applied to such things as detecting and monitoring transmission lines. At the top of the image can be seen a curved on/off ramp showing a moving reflection point.

It should be noted that the same succession of looks can also be used as video frames to form a video. In other words, the same sequence of looks may be processed either using "chronocolour" to colour code and form a composite image based on time, or used as frames in a video to dynamically show movement.

It will be appreciated from the foregoing that all of the methods described with reference to FIG. 6 benefit from the use of an agile micro satellite. Hitherto with traditional satellites it was possible to obtain only a few looks without reducing the resolution of each look. A suitably sized micro satellite can rotate to observe a target for an extended period of time (up to 60 seconds). This provides them the unprecedented capability of achieving many frames of imagery at the same resolution as the range resolution over a period of time.

Some embodiments of the invention have been realised with the following:

A satellite with an antenna that can point to the observation area and maintain its pointing to the same location for an extended period of time (60 seconds). This is usually far longer than a larger satellite is able to achieve (nominally 2 seconds as ICEYE satellites have a low mass and low moment of inertia thereby permitting antenna and beam pointing to be achieved without expenditure of fuel and using only internal momentum wheels).

A SPOTLIGHT mode of imaging that can maintain a target scene within its receive window even though the range to the target scene has a range that varies considerably.

A SPOTLIGHT mode SAR processor that is capable of processing SAR imagery as frames that have an arbitrary number of pulses per frame and a centre point that can be user defined.

A SPOTLIGHT mode SAR processor that can combine individual SAR frames into frames of a movie and export them as such.

In any of the embodiments of the invention, the satellite may be travelling in, or configured to travel in a low earth orbit.

A satellite according to any of the embodiments of the invention may be configured for side-looking, as is known in the art. It may have both left-looing and right-looking capability.

A satellite according to any of the embodiments of the invention may use x-band radar.

Any of the computing systems described herein may be combined in a single computing system with multiple functions. Similarly the functions of any of the computing systems described herein may be distributed across multiple computing systems.

Some operations of the methods described herein may be performed by software in machine readable form e.g. in the form of a computer program comprising computer program code. Thus some aspects of the invention provide a computer readable medium which when implemented in a computing system cause the system to perform some or all of the operations of any of the methods described herein. The computer readable medium may be in transitory or tangible (or non-transitory) form such as storage media include disks, thumb drives, memory cards etc. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The embodiments described above are largely automated. In some examples a user or operator of the system may manually instruct some steps of the method to be carried out.

In the described embodiments of the invention the system may be implemented as any form of a computing and/or electronic system as noted elsewhere herein. For example the ground station may comprise such a computing and/or electronic system. Such a system may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

The term "computing system" is used herein to refer to any device with processing capability such that it can execute instructions. Those skilled in the art will realise that such processing capabilities may be incorporated into many different devices and therefore the term "computing system" includes PCs, servers, smart mobile telephones, personal digital assistants and many other devices.

It will be understood that the benefits and advantages described above may relate to one embodiment or may relate to several embodiments. The embodiments are not limited to those that solve any or all of the stated problems or those that have any or all of the stated benefits and advantages.

Any reference to "an" item or "piece" refers to one or more of those items unless otherwise stated. The term "comprising" is used herein to mean including the method steps or elements identified, but that such steps or elements do not comprise an exclusive list and a method or apparatus may contain additional steps or elements.

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A satellite for operation in orbit around Earth comprising:
   a propulsion system;
   an attitude determination and control system (ADCS);
   one or more radar antennas or antenna arrays;
   synthetic aperture radar (SAR) image acquisition apparatus; and
   a communication system configured to send and receive signals to and from one or more ground stations on Earth,
   wherein the ADCS is configured for mechanically steering the satellite in the azimuth direction to prolong a dwell time, during which a selected target is visible from the satellite, by maintaining the target within the radar aperture as the satellite orbits over the target.

2. The satellite of claim 1 wherein the ADCS comprises one or more reaction wheels.

3. The satellite of claim 1, wherein the ADCS is configured to mechanically steer the satellite in the azimuth direction over a range of angles from −40 degrees to +40 degrees.

4. The satellite of claim 1, wherein the ADCS is configured to slew the satellite in the azimuth direction at up to 1 degree/second using mechanical steering.

5. The satellite of claim 1, having a total mass of less than 1000 k.

6. The satellite of claim 1, wherein the ADCS is configured for a dwell time of up to 60 seconds.

7. A ground station for receiving synthetic aperture radar (SAR) data from a satellite in orbit around Earth and processing the data to form one or more images of a target on Earth, wherein:
   the satellite comprises a propulsion system, an attitude determination and control system (ADCS), one or more radar antennas or antenna arrays synthetic aperture radar (SAR) image acquisition apparatus, and a communication system configured to send and receive signals to and from one or more ground stations on Earth;
   the ADCS is configured for mechanically steering the satellite in the azimuth direction to prolong a dwell time, during which a selected target is visible from the satellite, by maintaining the target within the radar aperture as the satellite orbits over the target; and
   the ground station comprises at least one processor configured to receive raw SAR data from the satellite, the raw data comprising pulse recordings resulting from the reflection of radio energy pulses transmitted from the satellite, from a target on Earth, wherein the radio energy pulses correspond to a range of angles in the azimuth direction achieved by steering the satellite in the azimuth direction to prolong a dwell time over the target.

8. The ground station of claim 7, wherein the range of angles is from −40 degrees to +40 degrees.

9. The ground station of claim 7, wherein the processor is further configured to form successive looks at the target, wherein each look is formed using data from a series of pulses.

10. The ground station of claim 9, wherein the processor is further configured to perform coherent summation of data from a series of pulses to form the successive looks at the target.

11. The ground station of claim 7, wherein the processor is further configured to perform incoherent summing of data to form a multi-looked image.

12. The ground station of claim 9, wherein theprocessor is further configured to form one or more video sequences from said successive looks at the target.

13. The ground station of claim 12, wherein the processor is further configured to receive one or both of a user selection of a period of overlap between successive images and a user selection of number of images to be generated during a predetermined time period, and generate the successive images in response to the user selection.

14. The ground station of claim 7, wherein the processor is further configured to color-code successive looks at the target to differentiate images corresponding to different time periods and combine them into one image by summing the color contributions.

15. The ground station of claim 14, wherein the different colors span the visible spectrum whereby features within the target that reflect homogeneously appear grey.

16. A satellite imaging system comprising a satellite as claimed in claim 1 and at least one ground station as claimed in claim 7.

17. A method of processing raw SAR data comprising pulse recordings resulting from the reflection of radio energy pulses transmitted from a satellite, from a target on Earth, wherein:
the method comprises: forming successive looks at the target using data from a series of pulses;
the satellite comprises (a) a propulsion system, (b) an attitude determination and control system (ADCS), (c) one or more radar antennas or antenna arrays, (d) synthetic aperture radar (SAR) image acquisition apparatus, and (e) a communication system configured to send and receive signals to and from one or more ground stations on Earth;
the ADCS is configured for mechanically steering the satellite in the azimuth direction to prolong a dwell time, during which a selected target is visible from the satellite, by maintaining the target within the radar aperture as the satellite orbits over the target; and
the radio energy pulses correspond to a range of angles in the azimuth direction achieved by steering the satellite in the azimuth direction to prolong a dwell time over the target.

18. The method of claim 17, wherein the range of angles is −40 degrees to +40 degrees.

19. The method of claim 17, comprising performing coherent summation of data from a series of pulses to form the successive looks at the target.

20. The method of claim 17 comprising incoherently summing data to form a multi-looked image.

21. The method of claim 17 comprising forming one or more video sequences from said successive looks at the target.

22. The method of claim 21, wherein the successive looks correspond to overlapping time periods within the dwell time.

23. The method of claim 21 comprising receiving one or both of a user selection of a period of overlap between successive images and a user selection of number of images to be generated during a predetermined time period, and generating the successive images in response to the user selection.

24. The method of claim 17 comprising color-coding successive looks at the target to differentiate images corresponding to different time periods and combining them into one image by summing the color contributions.

25. The method of claim 24 wherein the different colors span the visible spectrum whereby features within the target that reflect homogeneously appear grey.

26. A non-transitory computer readable medium comprising processor executable instructions which, when executed by a processor in a satellite image processing system, cause the system to process raw synthetic aperture radar (SAR) data comprising pulse recordings resulting from the reflection of radio energy pulses transmitted from a satellite, from a target on Earth, wherein:
the satellite comprises (a) a propulsion system, (b) an attitude determination and control system (ADCS), (c) one or more radar antennas or antenna arrays, (d) synthetic aperture radar (SAR) image acquisition apparatus, and (e) a communication system configured to send and receive signals to and from one or more ground stations on Earth;
the ADCS is configured for mechanically steering the satellite in the azimuth direction to prolong a dwell time, during which a selected target is visible from the satellite, by maintaining the target within the radar aperture as the satellite orbits over the target;
the processing of the raw synthetic aperture radar (SAR) data being performed by forming successive looks at the target using data from a series of pulses; and
the radio energy pulses correspond to a range of angles in the azimuth direction achieved by steering the satellite in the azimuth direction to prolong a dwell time over the target.

* * * * *